Patented Mar. 1, 1938

2,110,077

UNITED STATES PATENT OFFICE 2,110,077

PHENOLIC COMPOUNDS

Merlin Martin Brubaker, Wilmington, Del., assignor to E. I. du Pont de Nemours & Company, Wilmington, Del., a corporation of Delaware No Drawing. Application July 6, 1936, Serial No. 89,253

4 Claims. (Cl. 260—154)

This invention relates to phenolic compounds, and more particularly to new phenols which are alkylated derivatives of hydroxy-aromatic compounds.

This application is a continuation in part of my application Serial Number 662,001, filed March 21, 1933.

This invention has as an object the preparation of new phenols. A further object is the production of phenols highly useful in the manufacture of phenol-aldehyde resins. A still further object is the production of hydroxy-aromatic compounds alkylated with saturated branched-chain aliphatic alcohols of at least seven carbon atoms and obtainable from the reaction of carbon monoxide and hydrogen.

The phenols of this invention are made by reacting in the presence of a dehydrating agent a hydroxy-aromatic compound, a phenol such as phenol itself or a naphthol, with a branched-chain aliphatic alcohol of at least seven carbon atoms obtainable in the catalytic synthesis of methanol from carbon monoxide and hydrogen. Phenols of this kind, as disclosed in the above mentioned application, are particularly valuable in the manufacture of oil-soluble resins of the phenol-aldehyde type because their chemical constitution complies with the requirements I have found to be necessary to produce valuable oil-soluble resins without the use of modifying agents which usually adversely affect the properties desired. Thus, the following requirements, described in the above mentioned application, may be noted: (a) In order to retard heat-hardening properties, the number of free reactive positions, ortho and para to the phenolic hydroxyl while being at least one and preferably two shall be not more than two; (b) in order to confer oil solubility on the resin, these blocking substituents must constitute as a whole at least seven non-benzenoid carbons in the case of the mononuclear phenol; and (c) in order to impart resistance to discoloration, the blocking substituents should comprise a secondary or tertiary carbon atom attached to the benzene ring in the ortho or para position to a phenolic hydroxyl. Those phenolic bodies having all the phenolic hydroxyls blocked by a para-tertiary carbon are best.

In making the new phenols I condense with heat-treatment in the presence of a dehydrating agent a phenolic compound with a saturated branched-chain aliphatic monohydric alcohol other than a tertiary alcohol. Thus, I may heat a phenolic compound in the presence of zinc chloride with one of the individual branched-chain alcohols containing at least seven carbon atoms obtainable by the fractional distillation of the mixture of alcohols produced in the catalytic synthesis of methanol from carbon oxides. Or I may use in the reaction a mixture of alcohols containing seven or more carbon atoms, produced by the reaction of carbon monoxide and hydrogen in the presence of a catalyst. In general, I prefer to select such proportions of the reactants so as to obtain mostly the mono-alkylated phenol, although by suitable changes in the proportions of the reactants I may substantially increase the amount of poly-alkylated phenol found. It is frequently desirable to distil the crude reaction products to obtain substantially colorless products although for certain applications such a purification is not necessary.

The phenols of this invention are of the formula R—X—(OH)$_a$ where R is a forked carbon chain alkyl radical of at least seven carbon atoms, X is an aromatic nucleus and $a$ is an integer less than 4. A particularly useful species of this type are the compounds having the formula R—C$_6$H$_4$OH, wherein R is a forked carbon chain alkyl radical of at least seven carbon atoms.

The following examples are illustrative of the methods used in preparing my new phenols:

Example I

Paratertiary heptyl phenol: Eleven hundred thirty-two (1132) parts by weight of 2,4-dimethylpentanol-3 is condensed with 980 parts by weight of phenol by heating in the presence of 1080 parts by weight of zinc chloride for seven hours at 150° C. The reaction product is diluted with water, and the undissolved zinc chloride (ZnCl$_2$) filtered off. The water layer is separated and the crude heptyl phenol washed with water, dissolved in alkali, acidified with hydrochloric acid, and distilled under reduced pressure. The pure product, 4-hydroxyphenyldimethylisobutylmethane, boils at about 155° C./15 mm. It has the following formula:

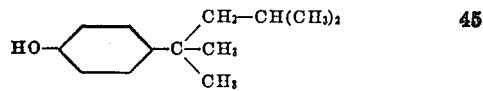

Other phenols which may be made in the same fashion as 4-hydroxyphenyldimethylisobutylmethane are 4-hydroxyphenyldimethylbutylmethane, 4-hydroxyphenyltriethylmethane, 4-hydroxyphenyldimethylisoamylmethane, 4-hydroxyphenyldiethylpropylmethane, 4-hydroxyphenylethylpropylbutylmethane, 3,5-dimethyl-3- hydroxyphenylheptane, 4-hydroxyphenylethylisobutylmethane, 4-hydroxyphenylpropylisopropylmethane, 4-hydroxyphenylisopropylisobutylmethane, 2-hydroxyphenyldimethylisobutylmethane, 2-hydroxyphenylisopropylisobutylmethane, 4-hydroxyphenyl-3,7-dimethylnonane.

In the same way that 2,4-dimethyl pentanol-3 forms 4-hydroxyphenyldimethylisobutylmethane, the folowing alcohols yield the indicated phenols or phenol mixtures.

| Alcohol | Phenol or phenol mixtures |
| --- | --- |
| 2-methylhexanol-3 | Hydroxyphenyldimethylbutylmethane<br>Hydroxyphenylisobutylethylmethane |
| 2-methylhexanol-4 | Hydroxyphenylpropylisopropylmethane<br>Hydroxyphenylmethylisoamylmethane |
| 3-methylhexanol-4 | Hydroxyphenylmethylethylpropylmethane<br>2-hydroxyphenyl-4-methylhexane |
| 3-ethylpentanol-2 | Hydroxyphenyltriethylmethane<br>1-hydroxyphenyl-3-ethylpentane |
| 2,5-dimethylhexanol-3 | Hydroxyphenyldimethylisoamylmethane<br>Hydroxyphenylisopropylisobutylmethane |
| 3,5-dimethylheptanol-4 | 3-hydroxyphenyl-3,5-dimethylheptane |
| 3,7-dimethylnonanol-5 | 4-hydroxyphenyl-3,7-dimethylnonane |

These phenols yield with formaldehyde hard resinous bodies of pale color which can be blended readily in wide proportions with drying oils to form stable light-resistant varnishes.

The exact structure of a number of the above phenols has not been definitely established in all cases. In certain cases the ortho isomer is obtained as well as the para isomer (the position of the phenolic hydroxyl for this reason was not indicated in the above table). Also, inasmuch as the reaction through which the phenol is formed from the alcohol may often proceed in two ways, a mixture of two phenols is frequently obtained; this is indicated in the above table.

*Example II*

A mixture of branched-chain primary and secondary alcohols boiling at 190–275° C. at atmospheric pressure obtained by fractionation of the mixture of higher alcohols produced in the catalytic synthesis of methanol from carbon monoxide and hydrogen and having an average molecular weight corresponding to 10.5 carbon atoms was employed in the alkylation of phenol as follows: 200 parts by weight of the mixed alcohols, 188 parts by weight of phenol and 200 parts by weight of zinc chloride were heated with agitation in a 1-liter 3-necked flask equipped with a condenser for 16 hours at 125–146° C. On cooling the reaction mixture was washed with warm dilute hydrochloric acid and finally with saturated salt solution. The slightly viscous, brown oil was diluted with ether, dried with sodium sulfate, filtered and distilled. 166 parts of the monoalkylated phenol was obtained as a yellow colored oil which distilled 125–200° C. at 3 mm.

*Example III*

A mixture of branched-chain primary and secondary alcohols boiling at 160–200° C. at atmospheric pressure obtained by fractionating the mixture of higher alcohols produced in the catalytic synthesis of methanol from carbon monoxide and hydrogen and having an average molecular weight corresponding to 8.5 was condensed with phenol as follows: 420 parts by weight of alcohol, 282 parts by weight of phenol, and 650 parts by weight of zinc chloride were heated in a 2-liter 3-necked flask equipped with an agitator, and a reflux condenser for 24 hours at 155–160° C. On cooling the product was washed twice with dilute hydrochloric acid, then with saturated salt solution and finally was dried with sodium sulfate, filtered and distilled. 242 parts by weight of the monosubstituted phenol was obtained as a yellow oil which distilled 85–133° C. at 2 mm. 125 parts by weight of the dialkylated phenol was obtained as a brown viscous oil which distilled 145–200° C. at 2 mm.

*Example IV*

A sample of the alcohols employed in Example II was fractionated and a fraction collected which distilled at 167–190° C. at 100 mm. and contained a substantial amount of the 12-carbon alcohol. 205 parts by weight of this fraction of alcohols, 188 parts by weight of phenol, and 217 parts by weight of zinc chloride were heated in a 1-liter 3-necked flask equipped with an agitator and a reflux condenser for 24 hours at 150–167° C. On cooling the product was washed with dilute hydrochloric acid, diluted with ether, washed several times with water, dried with sodium sulfate, filtered and distilled. 158 parts by weight of the monoalkylated phenol was obtained as a yellow colored oil which distilled 120–200° C. at 3 mm.

Twenty (20) parts by weight of 100% sulfuric acid was added to 26.2 parts by weight of this alkylated phenol with stirring. The temperature was maintained at 45–50° C. and it required 15 minutes to add the acid. The reaction mixture was heated 15 minutes longer, diluted with 200 parts by weight of cold water and neutralized with 26.3 parts by weight of 50% sodium hydroxide solution. This solution was diluted with water to give a concentration of 0.2 gram per liter and it was found to wet sulfur very readily. It was also a good wetting agent for cotton.

*Example V*

A sample of the alcohols employed in Example II was condensed with beta-naphthol as follows: 200 parts by weight of the mixture of alcohols, 216 parts by weight of beta-naphthol and 204 parts by weight of zinc chloride were heated with agitation in a 1-liter 3-necked flask equipped with a reflux condenser for 24 hours at 175° C. On cooling the reaction mixture was washed with dilute hydrochloric acid and finally with saturated salt solution. The brown oil was dried with sodium sulfate, filtered, and distilled. 110 parts by weight of the monoalkylated beta-naphthol was obtained as a viscous brownish colored oil which distilled 175–220° C. at 1 mm.

Twenty (20) parts by weight of 100% sulfuric acid was added slowly, with stirring, to 30 parts by weight of the alkylated beta-naphthol. The temperature was maintained at 45–50° C. for one hour. The reaction mixture was diluted with 200 parts by weight of cold water, and neutralized with 26 parts by weight of 50% sodium hydroxide solution. This solution was diluted with water to give a concentration of 0.2 gram per liter, and was found to wet powdered sulfur very readily. It was also a good wetting agent for cotton.

In place of phenol I may employ hydroquinone, resorcinol, catechol, cresol, the technical mixture of cresols known as cresylic acid, thymol, xylenols, eugenol, guaiacol, pyrogallol, alphanaphthol, etc. or any mixture of these phenolic compounds. I may employ for the alkylation of the phenols technical mixtures of alcohols as well as various pure alcohols which are formed in the catalytic synthesis of methanol from carbon monoxide and hydrogen as for example: 3,4-dimethyl pentanol-2; 3-methyl hexanol-2; 5-methyl octanol-3; 3-ethyl nonanol-2; 2,4-dimethyl pentanol-1; 4-methyl hexanol-1; 2,4-dimethyl hexanol-1; 5-methyl heptanol-1; 4,6-dimethyl heptanol-1; 2,6-dimethyl octanol-1; 2,4,6-trimethyl octanol-1; 2-ethyl-4,6-dimethyl octanol-1; 2,4,6-trimethyl decanol-1; 2,4,6,8-tetramethyl decanol-1; 3-methyl hexanol-2; 3-methyl heptanol-2; 5-methyl octanol-3; 3-ethyl nonanol-2, etc. In the synthesis of alkylated phenols to be used as intermediates for the preparation of surface active agents, I prefer to employ technical mixtures of branched-chain primary and secondary alcohols which average at least ten carbon atoms.

While the preferred temperature range for carrying out the reaction is 140–160° C., temperatures ranging from 100° C. to 250° C. are operable. If it is desired to obtain a high yield of the monosubstituted alkyl phenol an excess of the phenolic compound may be used during the reaction. The amount of zinc chloride used as the dehydrating agent may vary from 0.1 mol. to 5 mols per mol. of alcohol, although I generally prefer to use in the range of 0.5 mol. to 2 mols. When operating at high temperatures, the amount of dehydrating agent required is not as great as when carrying out the reaction at lower temperatures. In place of zinc chloride, I may employ other condensing agents such as sulfuric acid, aluminum chloride, boron trifluoride, etc.

An alternative procedure for producing the alkyl hydroxyl aromatic compounds is, for example, to condense the mixture of alcohols described in Example II with naphthalene in the presence of zinc chloride to obtain a monoalkylated naphthalene which distills 125–200° C. at 2 mm. and is obtained as a viscous, yellow oil. The sodium sulfonate of this monoalkylated naphthalene is surface active in aqueous solutions. The monoalkylated naphthol may be obtained by fusing the sulfonate with sodium hydroxide.

The alkylated hydroxy aromatic compounds of this invention are particularly useful as intermediates for the preparation of synthetic resins and of varnishes, as disclosed in detail in my copending application previously referred to. The alkylated resorcinols of this invention may be used as bactericides. These alkylated phenols may be used in lowering the pour point of lubricating oils or as intermediates for sulfonation to form wetting agents and detergents. The side chain alkyl substituted phenols and preferably those obtained from the dihydric phenols, e. g., catechol and hydroquinone, may be employed as gum forming inhibitors. Likewise, they may be employed as rancidity inhibitors in castor oil coating compositions, and in mustard. The sulfonated alkyl phenols which are obtained by treating the branched-chain phenols of this invention with sulfuric acid belong to the class of surface active or capillary active materials and may therefore be advantageously used in any processes involving wetting, penetrating, detergating, dispersing, emulsifying, frothing, foaming, and kindred phenomena. These compositions may be employed alone or, if desired, in conjunction with known processing or treating agents. They may be used by themselves or in combination with other surface active agents in any relation in which surface active agents having colloidal properties have heretofore been used. A few representative uses of these sulfonated products as textile assistants are mentioned in order that the importance and widespread applicability of these products in the textile industries may be more fully appreciated. They may be used alone or in combination with other suitable detergents for cleansing and scouring vegetable and animal fibers when removing fatty or oily materials. When added to flax retting baths, they function as wetting and penetrating agents.

My new sulfonated compounds may be employed as assistants in fulling and felting processes. They may be used in sizing preparations in combination with the usual materials such as starches or gelatine or their equivalents, clays, talcs, or their equivalents, oils and oils processed by oxidation, polymerization, sulfonation, etc. The penetrating power of these new compositions is utilized with advantage when they are added to baths containing starch ferments which are employed for removing sizing from textile materials. The sulfonated products function as useful wetting, cleansing and penetrating agents in leaching liquor such as those used in the kier boiling of cotton goods. They may be added to the lye liquors used for mercerizing cotton goods. They may be used in the preparation of dyestuffs in readily dispersable form and for the production of inorganic pigments or pigments of azo, basic, acid, vat, and sulfur dyes in a finely divided condition. As penetrants and wetting agents they assist in producing level dyeings in neutral, slightly acid, or alkalin dyeing baths. In printing pastes they assist in the dispersion of the dye or dye component and facilitate its penetration into the natural or synthetic fiber. In the leather industry these compositions function as useful wetting agents in soaking, deliming, batting, tanning, and dyeing baths.

The sulfonated compounds described herein are also useful in the preparation of emulsions of dispersions of liquid or solid hydrocarbons, higher alcohols, pitches and pitchy substances, etc. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of cosmetic preparations such as cold creams. They may be employed for preparing emulsions of the water-in-oil type such as emulsions of water in such organic solvents as are used in the dry cleaning industry.

These sulfonated compositions may be used as contact insecticides and for enhancing the spreading and penetrating power of other parasiticides. They may be employed in agricultural sprays in combination with the ordinary insecticides and fungicides. They are useful for promoting the penetrating power of wood preservatives. They may be used in the washing of fruits and vegetables for spray residue removal. They may be used in connection with metal cleaning compounds in neutral, acid or alkaline liquors. They may be used for paint, varnish and lacquer cleaners. They may be added to soap in hard water baths since these compositions do not form precipitates readily in hard water. These compositions may be used to control particle size and shape during precipitation or crystallization of compounds from reaction mixtures.

It will be seen from the foregoing that the phenols described herein, in addition to their use as ingredients for phenol-aldehyde resins, are useful for many other purposes, particularly as wetting agents as pointed out above. The branch non-benzenoid seven carbon atom side chain compounds claimed herein because of their high surface activity also have marked advantage over similar compounds containing a branched-chain of less than seven carbon atoms which are considerably less surface active.

As many apparently widely different embodiments of this invention may be made without departing from the spirit and scope thereof, it is to be understood that I do not limit myself to the specific embodiments thereof except as defined in the appended claims.

I claim:

1. A phenol of the formula R—$C_6H_4$OH in which R is a forked carbon chain alkyl radical of at least seven carbon atoms.

2. A compound of the formula R—X—(OH)$_a$ in which R is a forked carbon chain alkyl radical of at least seven carbon atoms, X is an aromatic nucleus, and $a$ is an integer less than 4.

3. A process which comprises heating in the presence of a dehydrating agent a phenolic compound and a branched-chain alcohol of at least seven carbon atoms, said alcohol being one which is obtainable from the mixture of alcohols formed in the catalytic synthesis of methanol from carbon monoxide and hydrogen.

4. A process which comprises heating in the presence of zinc chloride at 100° C. to 250° C. a phenol and a mixture of alcohols in proportions to form mostly a mixture of mono-alkylated phenols, said alcohols being branched chain aliphatic alcohols having an average molecular weight corresponding to at least 7 carbon atoms and obtainable from the mixture of alcohols formed in the catalytic synthesis of methanol from carbon monoxide and hydrogen.

MERLIN MARTIN BRUBAKER.